United States Patent [19]

Chamis et al.

[11] 4,029,838

[45] June 14, 1977

[54] HYBRID COMPOSITE LAMINATE STRUCTURES

[75] Inventors: Christos C. Chamis, Fairview Park; Raymond F. Lark, Westlake, both of Ohio

[73] Assignee: The United States of America as represented by the Administrator of the National Aeronautics and Space Administration, Washington, D.C.

[22] Filed: Sept. 24, 1975

[21] Appl. No.: 616,332

[52] U.S. Cl. .............................. 428/301; 428/328;
428/368; 428/418; 428/457; 428/902;
428/911
[51] Int. Cl.² .................... B32B 5/12; B32B 15/14;
B32B 27/38
[58] Field of Search .......... 428/297, 298, 301, 302,
428/317, 367, 368, 413, 418, 457, 902, 911,
328, 327, 366

[56] References Cited

UNITED STATES PATENTS

| | | | |
|---|---|---|---|
| 2,890,147 | 6/1959 | Pearson et al. | 428/297 X |
| 3,649,435 | 3/1972 | Varlas | 428/297 X |
| 3,755,059 | 8/1973 | Calfee | 428/367 X |
| 3,788,935 | 1/1974 | Shyne et al. | 428/366 X |
| 3,846,224 | 11/1974 | Leclercq et al. | 428/366 X |
| 3,894,863 | 7/1975 | Lachman et al. | 428/366 X |
| 3,956,564 | 5/1976 | Hillig | 428/366 |
| 3,959,544 | 5/1976 | Rogers | 428/902 X |
| 3,967,029 | 6/1976 | Veltri et al. | 428/902 |
| 3,972,529 | 8/1976 | McNeil | 428/367 X |
| 3,974,314 | 8/1976 | Fuchs | 428/302 X |
| 3,993,818 | 11/1976 | Novak et al. | 428/368 |

*Primary Examiner*—Harold Ansher
*Attorney, Agent, or Firm*—N. T. Musial; J. A. Mackin; John R. Manning

[57] ABSTRACT

The invention relates to laminate structures and specifically to essentially anisotropic fiber composite laminates wherein metal foils are selectively disposed within the laminate to produce increased resistance to high velocity impact, fracture, surface erosion, and other stresses within the laminate.

7 Claims, 6 Drawing Figures

HYBRID COMPOSITE LAMINATE STRUCTURES

BACKGROUND OF THE INVENTION

A. Field of the Invention

The invention relates generally to the field of laminate structures and particularly to hybrid composite laminates resistant to impact, residual stresses, and environmental degradation.

B. Description of the Prior Art

Structures formed of adhesively bonded fiber/resin and fiber/metal matrix composites have recently come into use as high strength, low weight replacements for structures previously formed of cast, stamped, or forged metals. In the aircraft industry in particular, these laminates have found numerous uses due their higher strength to weight ratios and resistance to corrosion and surface degradation.

These laminates have previously been subject to several problems not encountered in the use of metal structures, the cracking of the laminate along matrix stress lines when struck being perhaps the major falut of these structures. Attempts to overcome this and other problems have usually involved orienting the essentially anisotropic or "undirectional" fibers in several directions in order to prouce essentially isotropic structural character within the structure. However, since fiber composites exhibit greatest strength when the direction of the loading and the longitudinal axes of the fibers are coincident, this practice reduces the efficiency of the composite structure and tends to introduce lamination residual stresses comparable to the transverse and shear strength properties of the purely unidirectional composite. These stresses limit the resistance of the laminated structure to mechanical loading, and particularly to thermal and/or mechanical cyclic loading.

The very nature of the prior art laminates also acts to cause reduced resistance to mechanical fracture aside from the nature of the fiber materials themselves. These fiber-reinforced laminates are formed essentially of fibers set in a rigid matrix material, thereby resulting in a material of insufficient flexibility to absorb or dampen energy directed against point-type locations on the structure. A localized impact on the structure respresents a point-like injection of energy, the rigidity of the matrix material instantaneously transferring the injected energy through the laminate to the opposite side thereof. Thus, the opposite surface is placed under immediate elongation stress. The interface between the fibers and the matrix material is also subject to stress, these combinations of stresses resulting in interior cracking, crazing, and surface degradation. One serious problem thus previously faced in the field can be generally described as an inability of fiber/matrix composites to resist localized loading of both a mechanical and thermal nature without fracture within the material.

The present invention provides solution to this deficiency in prior art laminated structures by adhesively bonding layers of thin metal foils between the plies of fiber/matrix composites to form a hybrid laminate which exhibits the best characteristics of resin matrix, metal matrix and foil materials. The present hybrid composite laminates provide improved high velocity impact resistance, increased fracture toughness, resistance to surface erosion and corrosion, improved transverse and shear properties, improved resistance to stresses arising from local discontinuities, reduced lamination residual stresses, and increased cyclic load life while also being less expensive to fabricate than prior structures of comparable character.

SUMMARY OF THE INVENTION

Advanced lightweight composites used for fabrication of fan blades and other components of air-breathing engines and high performance structural components in general have proven to be only marginally cost effective due to the complex protection mechanisms required in the prior art to prevent resistance to impact damage. As such impact improvement and/or protection mechanisms continue to mature, their complexity, cost and weight continue to increase and tend to provide only marginal cost and weight savings over conventional metallic materials. The present invention completely reverses this trend and provides a laminate concept which improves fracture toughness and provides increaed resistance to foreign object impact and surface degradation at reduced fabrication costs. The present invention is a hybrid laminate wherein plies of nonmetallic and metallic fiber composites are interspersed within the laminate with plies of thin high strength metallic foils. The plies of metallic foils are attached to the fiber composite plies by adhesive and/or mechanical bonding. The use of both low and high temperature adhesives allows selective operation over a wide temperature range.

The use of the metallic foil plies within the present laminate structure provides a means for achieving a more favorable distribution of stresses in the laminate whenever the laminate is subjected to high stresses resulting from impact, discontinuities in the laminate, or other mechanical or thermal loading. The metallic foil plies themselves also provide a significant contribution to the torsional stiffness and transverse strength of the laminate. Thus, a great number of the anisotropic fibers within the composite plies can be effectively oriented in the direction along which the maximum imposed load will act on the structure. The high tensile strength of the essentially unidirectional fibers is thereby more efficiently utilized. The thin metallic foil plies and the thin metal and/or non-metal matrix fiber plies are adhesively bonded together to produce a laminate with less residual stress than present metallic matrix composites that are diffusion bonded. The adhesive bonding also produces low-cost high performance composite laminates which are highly resistant to point-type impact loading and surface degradation while exhibiting increased fracture toughness and cyclic load life.

Accordingly, it is a primary object of the invention to provide a hybrid laminate structure formed of plies of fiber/matrix composite materials interspersed with plies of thin metallic foils.

It is another object of the invention to provide a hybrid laminate structure wherein fiber composite materials comprising the structure are utilized in their undirectional configuration, i.e., with the longitudinal axes of at least a major portion of the fibers being aligned with the major stress vector acting on the structure, in order to utilize the high tensile strength of the fibers most efficiently.

It is a further object of the invention to provide a hybrid laminate structure which is easily fabricated at relatively low costs and which minimizes residual stresses within the structure while maximizing resistance to impact loading.

A still further object of the invention is to provide a composite laminate structure capable of optimum structural efficiency; maximum resistance to erosion, environmental degradation, and impact loading; and minimum notch sensitivity.

Further objects and advantages of the invention will become more readily apparent in light of the following detailed description of the preferred embodiments of the invention.

DESCRIPTION OF THE PREFERRED EMBODIMENTS

The present invention provides laminate structures comprised of plies of fiber/matrix composites interspersed with plies of high strength metallic foils, the plies being arranged in specific sequences and bonded together, such as by suitable adhesives, to form a structure highly resistant to a variety of stresses. The present laminate structures are preferably fiber reinforced, but the concept may be extended to plastic laminates, such as thermosetting resin plastics, which are not fiber reinforced. However, since fiber/matrix composite materials are generally more useful for high strength applications than non-reinforced plastic materials, the invention will be described in relation to such fiber-reinforced materials. As previously discussed, the present invention also provides additional advantages when fiber/matrix composite plies are utilized to form a laminar structure. A listing of the thermosetting, thermoplastic, or other non-metallic matrix materials useful in the practice of the present invention is not believed necessary to an understanding of the scope of the invention. Such listing could not practically be made and would be pointless in any event. It suffices to point out that the invention is useful with any matrix material of a non-metallic or metallic nature (including deposited metallic matrix materials), particuarly wherein essentially anisotropic fiber elements are disposed within the matrix material either in random orientation, partially random orientations, or aligned in a predetermined direction or directions. The fiber elements themselves may constitute a variety of filamentary or high strength "whisker" materials, such as glass filaments, from filaments and whiskers, or a great number of other materials having high tensile strength. It suffices to point out that these fiber elements share the common characteristic of high tensile strength, i.e., the strength along the longitudinal axis of the fiber is substantially greater than the axial strength of the fiber. Such materials are effectively anisotropic in structural character, i.e., having strength in one direction, as opposed to being isotropic, i.e., having essentially identical strength in all directions. A simple example of such a "fiber" is ordinary wire and a common example of a fiber/matrix composite material is the various forms of glass fiber-embedded resin plastics known generically as "fiberglass." The invention particularly allows the use of commercially available graphite-fiber/resin composite and boron-fiber/aluminum composites, which composites are inherently weak in impact and erosion resistance, to form an extremely impact and erosion resistant hybrid composite laminate. In particular, thin layers of these fiber/matrix composites are laminated together with selectively located plies of metallic foil, particularly titanium foil, to improve the transverse properties of the laminate and to eliminate the need for angle plying. It is to be pointed out that the metallic foil plies can be formed of any malleable metal, including copper, aluminum, gold, etc., the only requirement being that the metal be formable into a thin foil conformation.

Figure 1:
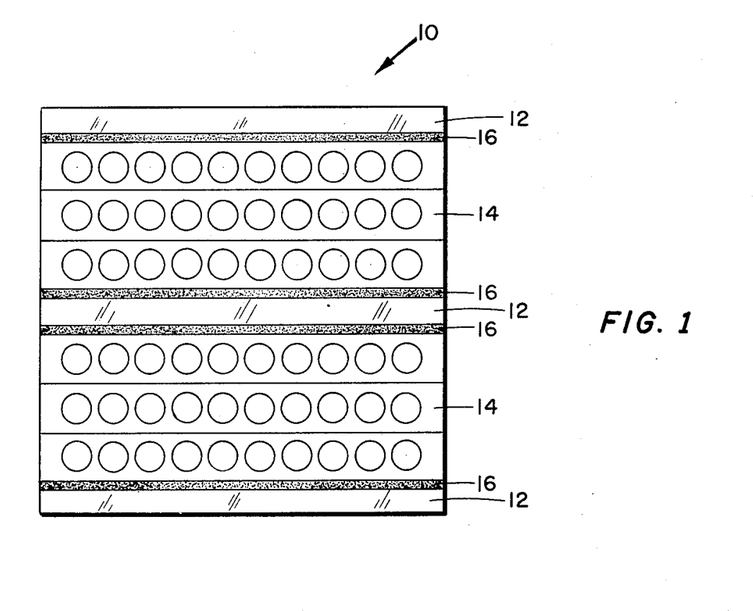
FIG. 1 is an elevation schematically renderd of a generalized hybrid composite structure fabriated according to the invention.

Referring to FIG. 1, a relatively simple hybrid laminate is seen at 10 to comprise alternating layers or plies of a metallic foil 12 and a fiber/matrix composite 14, the plies 12 and 14 being bonded together by relatively thin layers 16 of a suitable adhesive material. It is to be understood that FIG. 1 is intended only for illustration of the concept underlying the present invention. The arrangement of the plies 12 and 14 can vary in an almost infinite number of ways and can be built up to form a laminate of any desired height. Generally, however, the metal foil plies 12 are disposed within the laminate 10 on the upper and lower external surfaces as shown with at least one ply 12 disposed within the laminate 10. The fiber/matrix composite plies 14 may alternate with the metal foil plies 12 as shown or can alternatively be repeated any desired (and reasonable) number of times prior to a repeat of a metal ply 12. The laminate 10 could also be formed without internal foil plies 12. It also is to be understood that the fiber/matrix plies 14 may all be of the same composite material, such as glass fibers in an epoxy resin matrix, throughout the laminate 10, or may vary in any desired manner, such as alternation of glass fiber/epoxy and born fiber-/aluminum either alternating, or otherwise. Particularly useful structures will be described hereinafter.

The general structure of FIG. 1 is seen to provide a laminate structure having high transverse strength, transverse stiffness, and impact resistance due to the provision of the metallic foil plies 12 therein while retaining the high strength to weight characteristics of the fiber/matrix plies 14. As alluded to previously, fibers within the plies 14 can be oriented essentially in any desired direction to align with expected major stress loading since the plies 14 are not required to contribute substantially to the isotropic character of the laminate 10. Further, the metallic foil plies 12 act to more favorably distribute imposed stresses acting on the laminate 10, particularly point-type stresses caused by small are impact or localized thermal effects.

Figure 2:
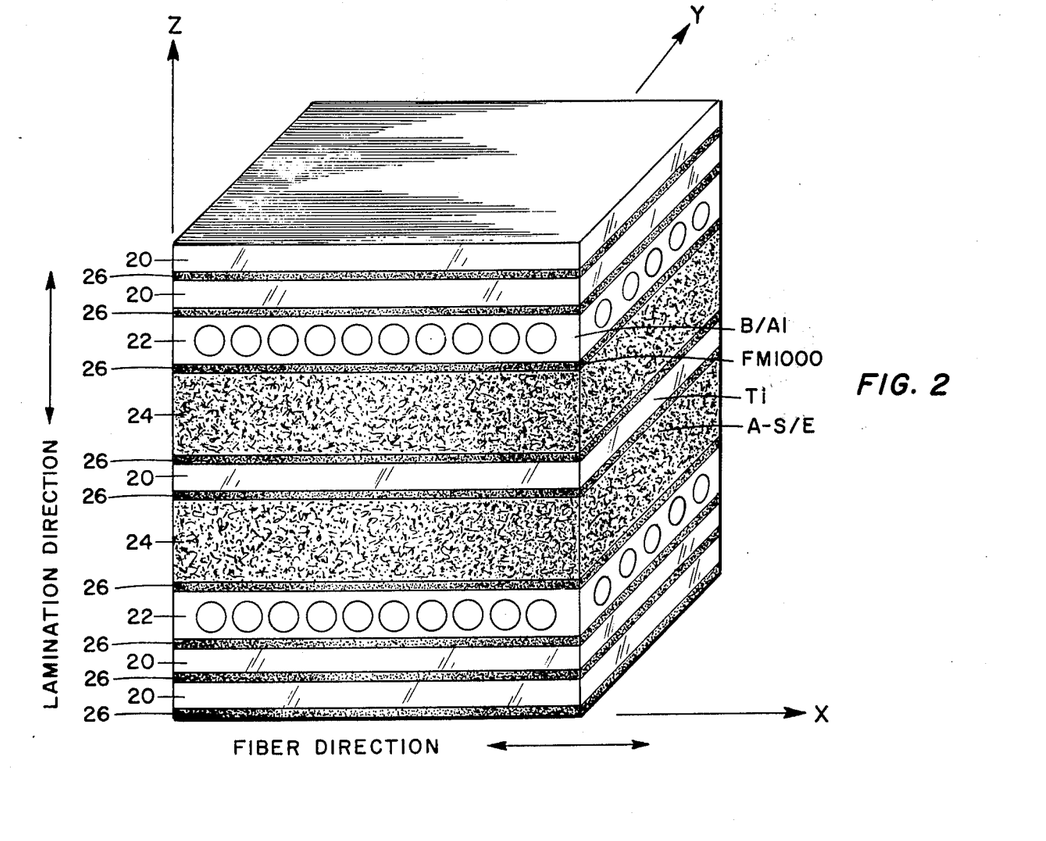
FIG. 2 is a schematic of a particular embodiment of the invention.

A particularly useful hybride composite is seen in FIG. 2 to comprise alternating plies of titanium foil 20, boron fiber/aluminum 22, and graphite fiber/epoxy 24, the plies 20, 22, and 24 being respectively bonded together by layers of an adhesive material 26. The boron fiber/aluminum plies 22 may be either diffusion bonded or adhesively bonded. The adhesive material 26 may be any suitable material, at least one example of which is particularly indicated hereinafter. This sequence of plies may be repeated any desirable and resonable number of times to provide a laminate structure of desired strength. It is also to be noted that double titanium foil plies 20 (separated by an adhesive layer 26) can be employed on the upper and lower external surfaces of the laminate. In the laminate shown in FIG. 2, the fibers, i.e., the boron and graphite fibers within the plies 22 and 24, are oriented in essentially one direction in order to maximize the stress-bearing efficiency of the laminate in that direction. Thus, although the laminate of FIG. 2 has maximum resistance to stress along the x-axis due to the fiber orientation within the plies 22 and 24, the total structure has torsional stiffness and a sufficient degree of isotropic character due to the titanium foil plies 20.

Composite laminates formed according to the prior art and according to the present invention were fabricated and tested to determine the nature and extent of the advantages provided by the present invention. In the following discussion, tables and figures, the Type I, II, and III laminates are prior art structures while the Type IV and Type V laminates are formed according to the present invention. The fabricated laminates were subjected to testing including tension flexure, thin specimen Izod impact, and notch sensitivity tests. Laminate analysis is utilizable to calculate the lamination residual stresses throughout the hybrid laminates, Types IV and V. In order for qualitative and quantitative comparisons of the test results to be meaningful, the geometry of the laminate specimens was kept as similar as was practical.

Description of the Composite Laminates

Five laminates, identified as Roman numerals I through V, were fabricated, the Types IV and V being fabricated according to the present invention while Types I through III are representative of the prior art. The particular structure of each laminate, the designation thereof, the constituent materials, and the sources of the materials are listed as follows in Table I:

TABLE I

| Type | Laminate Designation | Materials | Source |
|---|---|---|---|
| I | Gr/Ep | Unidirectinal typ A-S graphite fibers with type 3501/epoxy resin in the form of 3-inch wide prepreg tape | Hercules, Inc. |
| II | B/Al | Diffusion-bonded unidirectional layers of 5.6 mil diameter boron fibers in 1 6061 aluminum alloy matrix | Amercom, Inc. |
| III | B/Al | Monotape layers of 5.6 mil diameter boron fibers in a 6061 aluminum alloy matrix | Amercom, Inc. |
| | | Plies from the above monotape were adhesively bonded using FM 1000 structural adhesive in film form | American Cyanamid Co. |
| IV | Ti,B/Al (hybrid) | Titanium foil, (6A1-4V) 0.0015-inch thick as rolled | Teledyne Rodney Metals |
| | | Individual monotape layers of 5.6 mil diameter boron fibers in a 6061 aluminum alloy matrix | Amercom, Inc. |
| | | FM 1000 structural adhesive in film form | American Cyanamid Co. |
| V | Ti,B/Al,Gr/Ep (hybrid) | Titanium foil, (6A1,4V), 0.0015-inch thick | Teledyne rodney Metals |
| | | Individual monotape layers of 5.6 mil diameter boron fibers in a 6061 aluminum alloy | Amrcom, Inc. |
| | | Type A-S graphite/3501 prepreg | Hercules, Inc. |
| | | FM 1000 structural adhesive in film form | American Cyanamid Co. |

The thermal, physical, and mechanical properties of the constituent materials listed in Table I are summarized in Table II as follows:

TABLE II

| Property | Units | Ti (6 A1-4V) | Adhesive (FM-1000) | B/Al (5.6/6061) | Gr/Ep (A-S/3501) |
|---|---|---|---|---|---|
| Density | lb/in$^3$ | .16 | .042 | .095 | .057 |
| Nominal thickness | in. | .0015 | .0005 | .0070 | .0050 |
| Approximate fiber volume | percent | — | — | 50 | 60 |
| Modulus | $10^6$ si | | | | |
| $E_1$ | | 16.0 | .20 | 33.8 | 18.5 |
| $E_2$ | | 16.0 | .20 | 21.0 | 2.0 |
| $G_{12}$ | | 6.2 | .07 | 7.2 | .61 |
| $G_{23}$ | | 6.2 | .07 | 6.8 | .37 |
| Poisson's ratio | | | | | |
| $V_{12}$ | | .30 | .40 | .25 | .25 |
| $V_{23}$ | | .30 | .40 | .39 | .47 |
| Coefficient of thermal expansion | $10^{-6}$ in/.in./° F | | | | |
| $\alpha_1$ | | 5.8 | 40.0 | 3.3 | .33 |
| $\alpha_2$ | | 5.8 | 40.0 | 10.7 | 16.2 |
| Fracture stress | $10^3$ psi | | | | |
| $S_{1T}$ | | 120(2) | 220 | 181 | |
| $S_{1C}$ | | 120(1) | 10(2) | 250 | 165 |
| $S_{2T}$ | | 120(1) | 6(2) | 20 | 8 |
| $S_{2C}$ | | 120(1) | 10(2) | 25 | 25 |
| $S_S$ | | 70 | 7 | 23 | 13 |

(1) 0.2% offset yield strength
(2) Estimated value
Subscript notation:
1. along fiber direction
2. transverse to fiber
3. through thickness
T, tension
C, compression
S, shear

Fabrication of the Composite Laminates

The five composite laminates were respectively fabricated in the following ways:

Type I. Twelve unidirectiional plies of A-S/3501 graphite prepreg tape were assembled and cured in a metal mold using the standard curing conditions recommended by Hercules, Inc. for this type of epoxy resin system.

Type II. Eight unidirectional plies of B/Al were diffusion bonded by the manufacturer, Amercom, Inc. The diffusion bonding conditions consisted of 4500 psi pressure at a temperature of 950° F for one-half hour.

Type III. Seven unidirectional plies of B/Al were adhesively bonded using FM 1000 structural adhesive made by American Cyanamid Corp. of Havre DeGrace, Md. Prior to bonding, each B/Al ply was treated with a 10 percent sodium dichromate solution at room temperature for 5 minutes. Each ply was rinsed in water and methyl alcohol, then dried. During the bonding operation, a pressure of 600 psi, a temperature of 375° F, and a time of one-hour were used to cure this adhesive.

Type IV. Five sheets of titanium foil and six unidirectional plies of B/Al were adhesively bonded using FM 1000 structural adhesive. The foil was laid up so that its primary rolling direction was parallel to the fiber direction. Prior to bonding, the titanium foil plies were degreased and treated with a 5 percent hydrogen fluoride solution for 30 seconds at room temperature. This was followed by a water and methyl alcohol rinse and then drying. The prebonding treatment of the B/Al and the time-pressure-temperature cycle for curing was identical to that used for the Type III laminates.

Type V. Five sheets of titanium foil, two plies of B/Al, and six plies of graphite/epoxy were adhesively bonded. The titanium and B/Al plies received the same treatment prior to bonding as the Type IV laminates. FM 1000 adhesive was used for all of the meal-to-metal and metal-to-graphite interface bonds. The graphite/epoxy plies were bonded using the 3501 matrix resin. The time-pressure-temperature cycle was selected to initially cure the graphite/epoxy plies and then effect bonding at the FM 1000 interfaces. The procedure was as follows: After assembling the various components of the laminate in a metal mold, a thermocouple was placed in contact with the edge of the composite. A Wabash-type laminating press was then preheated to 275° F. The cold mold was placed in the press and 15 psig contact pressure was initiated. When the thermo-couple reached 100° F, contact pressure was maintained for 16 minutes. A pressure of 600 psig was then initiated and a temperature of 275°F. was maintained for another 14 minutes to complete gelation of the epoxy matrix resin. At the end of this time period, the press temperature increased to 300° F. and pressure was maintained for 30 minutes to advanve the cure of the epoxy. At the end of this time period, the press temperature was increased to 350° F. and pressure was maintained for 120 minutes to complete the cure of the epoxy and the adhesive. The press heaters were turned off and the laminates was permitted to cool under pressure to room temperature.

A detailed decription, in tabular form, of the arrangement of the material, plies, and the corresponding thicknesses thereof, is provided in Table III as follows.

TABLE III

PROPERTIES OF SMOOTH TENSILE SPECIMENS

| | Composition (Gr/Ep) Type-I | | | Composition Dif. Bonded (b/al) Type-II | | | Composition Adh. bonded (B/Al) Type-III | | | Composition Ti(B/al) Type-IV | | | Composition Ti/(B/Al)/(A-S/E) Type-V | |
|---|---|---|---|---|---|---|---|---|---|---|---|---|---|---|
| Layer No. | Material | $t$,[1] in. | Layer no. | Material | t, in. | Layer no. | Material | t, in. | Layer no. | Material | t, in. | Layer no. | Material | t, |
| 1 | A-S/3501 | 0.0049 | 1 | B/Al (5.6 mil, 6061) | 0.0069 | 1 | B/Al | 0.0074 | 1 | Ti (6-4) | 0.0015 | 1 | Ti | 0.0015 |
| 2 | ↓ | ↓ | 2 | ↓ | ↓ | 2 | FM 1000 | .0003 | 2 | FM 1000 | .0001 | 2 | FM 1000 | .0007 |
| 3 | | | 3 | | | 3 | B/Al | .0074 | 3 | Ti | .0015 | 3 | Ti | .0015 |
| 4 | | | 4 | | | 4 | FM 1000 | .0003 | 4 | FM 1000 | .0001 | 4 | FM 1000 | .0007 |
| 5 | | | 5 | | | 5 | B/Al | .0074 | 5 | B/Al | .0074 | 5 | B/Al | .0074 |
| 6 | | | 6 | | | 6 | FM 1000 | .0003 | 6 | FM 1000 | .0001 | 6 | FM 1000 | .0007 |
| 7 | | | 7 | | | 7 | B/Al | .0074 | 7 | B/Al | .0074 | 7 | A-S/E | .0050 |
| 8 | | | 8 | | | 8 | FM 1000 | .0003 | 8 | FM 1000 | .0001 | 8 | A-S/E | .0050 |
| | | | | (Total thickness 0.0552) | | | | | | | | | | |
| 9 | | | | | | 9 | B/Al | .0074 | 9 | B/Al | .0074 | 9 | A-S/E | .0050 |
| 10 | | | | | | 10 | FM 1000 | .0003 | 10 | FM 1000 | .0001 | 10 | FM 1000 | .0007 |
| 11 | | | | | | 11 | B/Al | .0074 | 11 | Ti | .0015 | 11 | Ti | .0015 |
| 12 | ↓ | ↓ | | | | 12 | FM 1000 | .0003 | 12 | FM 1000 | .0001 | 12 | FM 1000 | .0007 |
| (Total thickness 0.0588) | | | | | | 13 | B/Al | .0074 | 13 | B/Al | .0074 | 13 | A-S/E | .0050 |
| | | | | | | (Total thickness 0.0536) | | | 14 | FM 1000 | .0001 | 14 | A-S/e | .0050 |
| | | | | | | | | | 15 | B/Al | .0074 | 15 | A-S/E | .0050 |
| | | | | | | | | | 16 | FM 1000 | .0001 | 16 | FM 1000 | .0007 |
| | | | | | | | | | 17 | B/Al | .0074 | 17 | B/Al | .0074 |
| | | | | | | | | | 18 | FM a000 | .0001 | 18 | FM 1000 | .0007 |
| | | | | | | | | | 19 | Ti | .0015 | 19 | Ti | .0015 |
| | | | | | | | | | 20 | FM 1000 | .0001 | 20 | FM 1000 | .0007 |
| | | | | | | | | | 21 | Ti | .0015 | 21 | Ti | .0015 |
| | | | | | | | | | (Total thickness 0.0529) | | | (Total thickness 0.0579) | | |

[1] t Denotes layer thickness.

Description of Composite Laminate Testing

The laminates fabricated as described above and ranging in thickness from 0.05 to 0.06 inches were cut into 0.5 inch width specimens by using a precision wafer cutting machine equipped with a diamond cutting wheel. To determine the notch sensitivity of the laminates being investigated, through-the-thickness, center slots were placed in specimens using electrical discharge machining. All notched specimens were machined this way except for the Type 1 transverse specimen. This specimen was double edge notched using a 0.005-inch wide cutting wheel. In all cases the notch root radius was 0.003-inch or less. A single slot length, 0.017-inch, was used for tests on laminate Types I, II, and V. Two slot lengths, 0.010-inch and 0.017-inch, were used for tests on laminate types III and IV. Where required, the specimen ends were reinforced with adhesively bonded aluminum or fiber glass tabs. All the specimens for determining longitudinal smooth tensile properties had their ends reinforced. In addition, all Type 1 specimens that were subjected to tensile loadings had their ends reinforced. The specimens used to determine smooth tensile properties were instrumented with strain gages to measure longitudinal and transverse strain.

The following tests were conducted:

1. Composite density. Samples of each of the five laminate types were evaluated for density by using the ASTM D-792 test method for "Specific Gravity and Density of Plastics by Displacement";

2. Smooth and Notch Tensile Strengths. The smooth and notch tensile specimens were loaded to failure using a hydraulically actuated universal testing machine. Longitudinal specimens had a test section about 3-inches long, while transverse specimens had a test section about 2-inches long. The notched specimens were loaded to failure and the maximum load noted. Loading was halted at convenient intervals when testing the smooth specimens so that strain gage data could be obtained using a digital strain recorder;

3. Flexural strengths. Test specimens having a length of 3-inches were tested for flexural strength in an Instron testing machine. A 3-point loading system was used with a span of 2-inches; and, 4. Izod impact strengths. Unnotched specimens were subjected to Izod impact strength tests using a TMI Impact Tester equipped with a 2-pound hammer. The velocity of the hammer was 11 feet/second. Results of the Composite Laminate Testing Test results were obtained for the various composite laminates as follows:

1. Density. The measured densities of the laminates tested are given in the third column of table IV. Note that the density of laminate V (Ti,B/Al,Gr/E$_p$) is substantially the same as that of E-Glass/epoxy (0.075 lb/in$^3$);

2. Smooth Tensile Tests

Figure 3A:
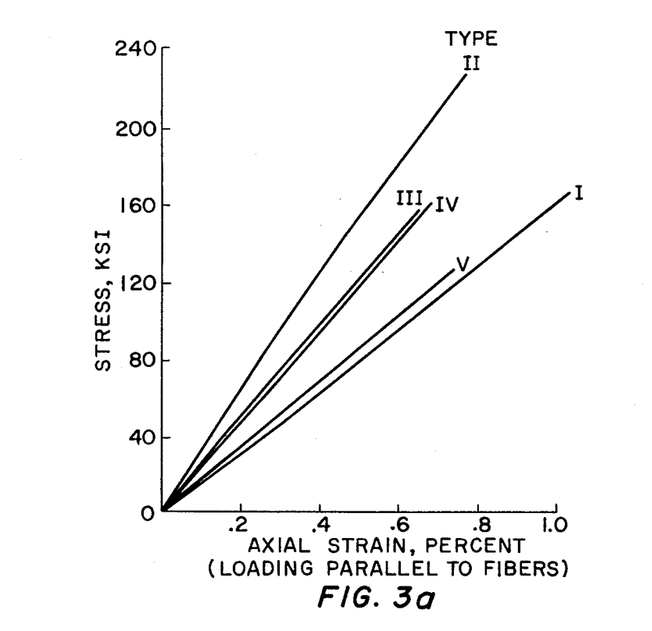
FIG. 3a and 3b each show a stress vs. axial strain curve illustrating test results for the specimens tested as described in the specification; and, FIGS. 4a and 4b each show a similar curve of axial strain vs. Poisson's strain illustrating test results for the specimens tested as described in the specification.
Figure 3B:
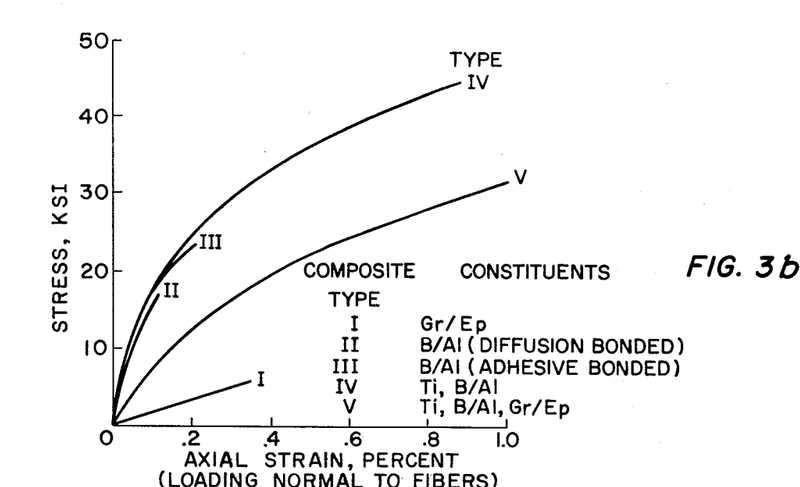
Figure 4A:
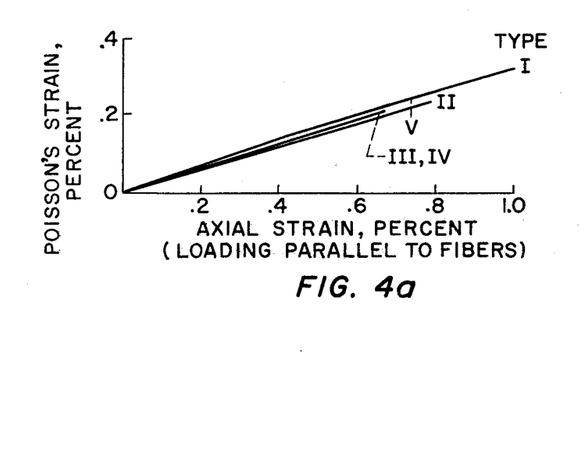
Figure 4B:
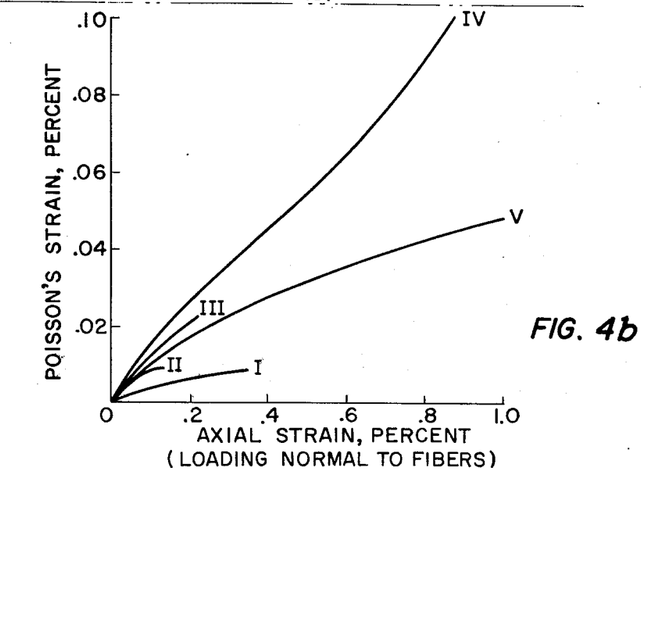

Table IV also summarizes the test data obtained fro smooth specimens (specimens without slots). This table includes laminate longitudinal (load applied parallel to fibers) and transverse (load applied normal to fibers) tensile properties. Note in this table that the initial tangent moduli and Poisson's ratios are given. As can be seen in Table III, inclusion of titanium foil layers in the hybrids improves the transverse strength properties relative to the unidirectional material. The longitudinal and transverse fracture strains of the two hybrids are approximately equal. Comparing the results of the diffusion-bonded and adhesively-bonded B/Al laminates in Table IV, it is seen that these laminates have approximately equal properties except for the longitudinal fracture stress. The longitudinal fracture stress of the adhesively-bonded laminate is about 70 percent of that of the diffusion bonded laminate. Stress-strain curves for all of the laminate types are shown in FIG. 3a for loads parallel to fibers and in FIG. 3b for loads transverse to the fibers. Note that the stress-strain curves are linear to fracture, or nearly so, for specimens loaded parallel to the fibers (FIG. 3a). However, specimens loaded transverse to the fibers exhibit considerable non-linearity (FIG. 3b). Curves of Poisson's strain versus axial strain are shown in FIGS. 4a and 4b.

One interesting result was the failure mode of the Type V lamiate (Ti,B/Al,Gr/Ep) tested in longitudinal tension. The boron/aluminum plies failed when the tensile stress produced strain about equal to the fracture strains of the boron fibers. The Gr/Ep plies remained intact and therefore still capable of carrying mechanical load. This favorable failure mode is very significant since these hybrids can therefore be designed to be inherently fail-safe.

3. Notch Tensile Tests

The test data obtained from slotted specimens are summarized in Table V. Two interesting points to be observed from the data in Table V are the following:

a. The notch effects are small and about the same for both the longitudinal and transverse directions in the hybrid composites.

b. Notch strengthening for the transverse tensile specimens was observed in both the diffusion-bonded and adhesively-bonded B/Al laminates. This strengthening may be attributed, in part, to the transverse restraining effects of the fibers at the slot ends.

TABLE IV

| Laminate type | Constituents | Density lb/in$^3$ | Fracture strength 10$^3$ psi | | Fracture strain percent | | Initial modulus of elasticity 10$^6$ psi | | Initial Poisson's ratio | |
|---|---|---|---|---|---|---|---|---|---|---|
| | | | Long. | Trans. | Long. | Trans. | Long. | Trans. | Long. | Trans. |
| I | Gr/Ep | 0.057 | 164 | 5.6 | 1.02 | 0.34 | 15 | 1.8 | 0.33 | 0.03 |
| II | B/Al[1] | .089 | 228 | 17.7 | .79 | .12 | 32 | 25 | .24 | .14 |
| III | B/Al[2] | .091 | 159 | 23.7 | .67 | .21 | 30 | 23 | .26 | .14 |
| IV | Ti, B/Al | .098 | 160 | 44.1 | .68 | .88 | 27 | 20 | .27 | .18 |
| V | Ti, B/Al, Gr/Ep | .74 | 125 | 31.5 | .73 | 1.01 | 18 | 8.5 | .25 | .11 |

[1] Diffusion-bonded
[2] Adhesive-bonded

TABLE V

| Laminate type | Constituents | Notch length in. | Net fracture strength 10$^3$ psi | | Notch strength ÷ Unnotched strength | |
|---|---|---|---|---|---|---|
| | | | Long. | Trans. | Long. | Trans. |
| I | Gr/Ep | 0.17 | (3) | 2.2[4] | 1.00 | .39[4] |
| II | B/Al[1] | .17 | 157 | 27.5 | .69 | 1.55 |
| III | B/Al[2] | .10 | 142 | 27.9 | .89 | 1.18 |

TABLE V-continued

| Laminate type | Constituents | Notch length in. | Net fracture strength 10³ psi | | Notch strength ÷ Unnotched strength | |
|---|---|---|---|---|---|---|
| | | | Long. | Trans. | Long. | Trans. |
| III | B/Al[2] | .17 | 140 | 22.4 | .88 | .95 |
| IV | Ti, B/Al | .10 | 140 | 39.0 | .87 | .88 |
| IV | Ti, B/Al | .17 | 134 | 36.6 | .84 | .83 |
| V | Ti, B/Al, Gr/Ep | .17 | 98 | 24.0 | .78 | .76 |

[1]Diffusion-bonded
[2]Adhesive-bonded
[3]No notch growth, specimen split parallel to fibers
[4]Double edge notch specimen

4. Flexural Tests

The test data obtained from subjecting test specimens to 3-point flexural loading are summarized in Table VI. The important points to be observed from the data in Table VI are the following:

1. The hybrid composites exhibit significant improvement in transverse strength compared to other composites.
2. The hybrid composites exhibit a decrease in the longitudinal flexural strength compared to other composites.
3. The hybrid composite flexural longitudinal modulus is slightly less than the B/Al composite and greater than the Gr/Ep composite.
4. The transverse modulus of the Ti,B/Al, Gr/Ep hybrid composite is about four times greater than that of the Gr/Ep composite.

TABLE VI

| Laminate type | Constituents | Fracture stress 10³ psi | | Modulus[1] 10⁶ psi | |
|---|---|---|---|---|---|
| | | Long. | Trans. | Long. | Trans. |
| I | Gr/Ep | 246 | 8 | 20 | 2.5 |
| II | B/Al[2] | 304 | 39 | 39 | 14 |
| III | B/Al[3] | 204 | 46 | 31 | 17 |
| IV | Ti, B/Al | 204 | 97 | 27 | 17 |
| V | Ti, B/Al, Gr/Ep | 185 | 83 | 22 | 11 |

[1]The modulus was computed using chart deflection and a calibration factor to account for instron compliance. These values are only approximate.
[2]Diffusion-bonded
[3]Adhesive-bonded

5. Impact Tests

Data obtained by subjecting the thin composite specimens to unnotched Izod impact tests are summarized in Table VII. Note in Table VII the impact strengths of some other composites and materials are given for comparison purposes. In order to make the comparison meaningful, the Izod impact data were normalized with respect to the cross sectional area of the composite. In Table VII, the low and high Izod impact strengths and the number of specimens for each composite or material are given.

The important point to be observed from the data in Table VII is the following:

Using the metal and resin matrix hybrid composite concept, composite materials may be designed with Izod impact resistance approaching that of aluminum. In addition, when the Izod impact values are normalized with respect to density the longitudinal impact resistance of the Type V hybrid is about 70 percent of that of the titanium.

TABLE VII

| Laminate type | Constituents | Test direction | IZOD impact strength in.-lb/in.² | | Number of specimens |
|---|---|---|---|---|---|
| | | | Low | High | |
| I | Gr/Ep | Long. | 325 | 357 | 4 |
| | | Trans. | 44 | 48 | 2 |
| II | B/Al[1] | Long. | 277 | 286 | 2 |
| | | Trans. | 229 | 247 | 2 |
| III | B/Al[2] | Long. | 155 | 216 | 2 |
| | | Trans. | 98 | 159 | 4 |
| IV | Ti, B/Al | Long. | 247 | 253 | 2 |
| | | Trans. | 179 | 224 | 4 |
| V | Ti, B/Al, Gr/Ep | Long. | 634 | 720 | 2 |
| | | Trans. | 186 | 202 | 2 |
| Other Materials | | | | | |
| HT-S/PMR-PI[3] | | Long. | 204 | 206 | 2 |
| | | Trans. | 40 | 43 | 2 |
| Glass-fabric/epoxy | | — | 249 | 255 | 3 |
| 4-mil diam B/6064-Al | | Long. | 253 | 272 | 2 |
| Aluminum 0.6061 | | — | 756 | 914 | 2 |
| Titanium (6Al-4v) | | — | 2525 | 2558 | 2 |

[1]Diffusion-bonded
[2]Adhesive-bonded
[3]PMR-polymerization of monomeric reactants; PI-polyimide Predicted Density and Elastic Properties of the Present Hybrid Laminates Laminate analysis was used to assess the applicability of linear laminate analysis to the present hybrid composites. For this purpose, the laminate analysis available in the well-known Multilayer Fiber Composite Analysis Computer Code was used. The inputs for the analysis of the metal and resin matrix hybrid composites consisted of the ply constituent properties data in Table II and the ply arrangement and thicknesses data in Table III.

The output of the computer code consists of the following:

1. composite density
2. longitudinal, transverse and shear moduli
3. major and minor Poisson's ratios 4. plate-type bending stiffneses, a measure of the structural response of the laminate.

The flexural longitudinal and transverse moduli are obtained from the plate-type bending stiffnesses using the following equations:

$$E_{FL} = 12(D_{11} - D_{12}^2/D_{22})/t^3 \quad 1.$$

$$E_{FT} = 12(D_{22} - D_{12}^2/D_{11})/t^3 \quad 2.$$

where $E$ denotes modulus; the subscript $F$ flexural, $L$ longitudinal and $T$ transverse; the $D$'s denote plate-type bending stiffnesses with the subscript 1 taken along the fiber direction and 2 transverse to it; and $t$ denotes the laminate thickness.

The results of the laminate analysis via the computer code are summarized in Table VIII. In this table the flexural moduli predicted by equations (1) and (2) are given. Also, corresponding values for aluminum and titanium are included for comparison purposes. As can be seen from these data, unidirectional hybride composites can be designed for torsional stiffness equal to that of aluminum.

agreement with initial measured data. Comparing corresponding values from Tables VI and VII, it is seen that linear lamiate theory predicts flexural longitudinal moduli which are in very good agreement with measured data. The comparisons for flexural transverse moduli is fair with the predicted values higher than those measured. This is to be expected since transverse flexural loaidng strains the specimen nonlinearly as shown in FIG. 3b. The important point from the above comparisons is that laminate theory is suitable for predicting the structural response of the metal matrix and resin matrix fiber composite hybrids. And from what has been discussed previously, laminate theory is expected to be applicable for predicting the strength of these hybrids based on constituent plies and materials fracture data.

It is also important to note the following observations:

1. The mechanical test results show that adhesive bonding produces high quality composites and composites with improved impact and transverse

TABLE VIII

| Laminate type | Constituents | Density lb/in.³ | Modulus 10⁶ psi | | | Poisson's ratio | | Plate type bending stiffness⁽¹⁾ lb-in. | | | | Flexural modulus 10⁶ psi | |
|---|---|---|---|---|---|---|---|---|---|---|---|---|---|
| | | | Long. | Trans. | Shear | Major | Minor | $D_{11}$ | $D_{12}$ | $D_{22}$ | $D_{33}$ | Long. | Trans. |
| I | Gr/Ep | 0.057 | 18.5 | 2.0 | 0.61 | 0.25 | 0.027 | 316 | 8.5 | 34.1 | 10.3 | 18.5 | 2.0 |
| II | B/Al⁽³⁾ | .095 | 33.0 | 21.0 | 7.20 | .25 | .16 | 482 | 77.6 | 306 | 101 | 33.0 | 21.0 |
| III | B/Al⁽⁴⁾ | .093 | 31.9 | 20.3 | 6.96 | .25 | .16 | 430 | 68.5 | 274 | 90.2 | 31.9 | 20.3 |
| IV | Ti, B/Al | .103 | 30.0 | 19.9 | 6.92 | .26 | .17 | 353 | 65.0 | 247 | 82.8 | 27.2 | 19.0 |
| V | Ti, B/Al, Gr/Ep | .079 | 20.2 | 8.7 | 3.0 | .26 | .11 | 359 | 60.5 | 226 | 75.9 | 21.1 | 13.3 |
| Metal (Measured values) | | | | | | | | | | | | | |
| | Al (6061) | .098 | 10.0 | 10.0 | 3.61 | .33 | .33 | 203 | 65.5 | 203 | 130 | 10.0 | 10.0 |
| | Ti (6Al-4V) | .160 | 16.0 | 16.0 | 6.2 | .30 | .30 | 316 | 95.0 | 316 | 223 | 16.0 | 16.0 |

⁽¹⁾Properties predicted via Multilayer Fiber Composite Computer code (ref. 1)
⁽²⁾Plate-type stiffness for metals were computed from the relation $D_{11} = D_{22} = Et^3/12(1-v^2)$ and $D_{33} = Et^3/6$ where t was taken as 0.06 in.
⁽³⁾Diffusion-bonded
⁽⁴⁾Adhesive-bonded Lamination residual stresses are induced in the constituent material layers of the metal and resin matrix composites because of:

1. mismatch of the thermal coefficient of expansions
2. the temperature difference between the cure and room temperatures.

The lamination residual stresses are computed using laminate analysis and the results are summarized in Table IX.

TABLE IX

| | | Residual stress, 10³ psi | | | | | | | |
|---|---|---|---|---|---|---|---|---|---|
| | | Ti foil | | B/Al | | Gr/Ep | | Adhesive | |
| Laminate | Constituents | Long. | Trans. | Long. | Trans. | Long. | Trans. | Long. | Trans. |
| I | Gr/Ep | — | — | — | — | 0 | 0 | — | — |
| II | B/Al⁽¹⁾ | — | — | 0 | 0 | — | — | — | — |
| III | B/Al⁽²⁾ | — | — | −0.1 | −0.1 | — | — | 3.6 | 3.1 |
| IV | Ti, B/Al | 5.6 | −19.3 | −1.0 | 3.2 | — | — | 3.6 | 3.1 |
| V | Ti, B/Al, Gr/Ep | 12.1 | −19.6 | 11.7 | 2.4 | −9.5 | 3.1 | 3.6 | 3.2 |

⁽¹⁾Diffusion-bonded
⁽²⁾Adhesive-bonded

When the lamination residual stresses shown in Table IX are compared with corresponding fracture (yield) stresses in Table II, it is seen that the lamination residual stresses are relatively low. For example, those in the adhesive are less than 50 percent of the corresponding fracture stresses. Since the adhesive has relatively low stiffness compared to the other constituents, the hybrid can be subjected to considerable mechanical load before the adhesive will reach its fracture stress.

Comparing corresponding values from Tables IV and VIII, it is seen that the laminate theory predicts densities, moduli, and Poisson's ratios which are in good properties.

2. Using composites in the unidirectional configuration simplifies the fabrication process. Introduction of the titanium layers improves transverse properties sufficiently so that angleplying is not necessary.
3. The hybrids with the titanium layers will offer distinct advantages over other composites where erosion and impact resistance control the design. In addition these hybrids should be suitable for joints and load transfer in highly loaded components.
4. Optimum combinations of metal/matrix composites and titanium layers with resin/matrix composites are possible to meet a multitude of design requirements while maintaining fabrication simplicity and low lamination residual stresses.
5. The fracture path/surface of the hybrids tested in this investigation appears to be well defined as compared with advanced nonhybrid composites.

The preceding test evidence shows that hybrid laminate structure fabricated according to the present invention have the following desirable properties:
 a. Longitudinal strength and stiffness approaching corresponding properties of other advanced fiber composites.
 b. Transverse flexural strength approaching that of the yield strength of titanium, 6Al-4V alloy.
 c. Longitudinal impact resistance approaching that of aluminum.
 d. Transverse and shear stiffnesses comparable to those of 6061 aluminum.
 e. Density comparable to that of commercially-available E-glass/epoxy composites.

Judicious location of the titanium-foil layers in the laminates may result in predictable high energy absorption failure modes for these hybrids. Along the fiber direction, fracture is governed by the fiber fracture strain. Transverse to the fiber direction and in shear, fracture appeared to be governed by the yield strain of the titanium foils.

The lamination residual stresses in the adhesive ae about 50 percent of its corresponding failure stresses. Therefore, capacity remains for carrying mechanical load in the hybrid composites.

The Ti/B/Al/Gr/Ep hybrid exhibited a primary fracture whereby the (B/Al) plies failed leaving the Gr/Ep plies intact, thereby providing a fail-safe composite structural material.

What is claimed is:

1. A hybrid structural laminate comprising alternating plies of a matrix material and planar metallic foil; said matrix material being embedded with fiber elements having substantially unidirectional strength characteristics, said fiber elements being oriented within said matrix material with the longitudinal axes thereof extending in substantially the same direction; said foil plies alternating within the laminate structure with said matrix material plies, said matrix material being metal for outermost plies and non-metallic for innermost plies; and
said fiber embedded metal matrix material being aluminum with boron fibers therein.

2. The laminate of claim 1 wherein the plies are bonded together by means of an adhesive material.

3. A hybrid structural laminate comprising alternating plies of a matrix material and planar metallic foil; said matrix material being embedded with fiber elements having substantially unidirectional strength characteristics, said fiber elements being oriented within said matrix material with the longitudinal axes thereof extending in substantially the same direction; said foil plies alternating within the laminate structure with said matrix material plies, said matrix material being metal for outermost plies and nonmetallic for innermost piles;
said fiber embedded matrix material being aluminum with boron fibers therein and wherein the non-metal fiber-embedded matrix material comprises graphite fibers embedded in an epoxy resin matrix material.

4. The laminate of claim 3 wherein the plies of metallic foil comprise titanium metal.

5. The laminate of claim 4 wherein the titanium foil plie are disposed within the laminate at least on the upper and lower external surfaces thereof.

6. The laminate of claim 5 wherein the titanium foil plies are double layered on said surfaces and bonded together by means of an adhesive material.

7. The laminate of claim 5 wherein the titanium foil plies alternate within the laminate structure with the boron/aluminum plies and the graphite/epoxy plies.

* * * * *